(12) United States Patent
Busch et al.

(10) Patent No.: US 12,321,853 B2
(45) Date of Patent: Jun. 3, 2025

(54) SYSTEMS AND METHODS FOR NEURAL NETWORK TRAINING VIA LOCAL TARGET SIGNAL AUGMENTATION

(71) Applicant: SYNTIANT, Irvine, CA (US)

(72) Inventors: Kurt F. Busch, Laguna Hills, CA (US); Jeremiah H. Holleman, III, Irvine, CA (US); Pieter Vorenkamp, Laguna Beach, CA (US); Stephen W. Bailey, Irvine, CA (US); David Christopher Garrett, Tustin, CA (US)

(73) Assignee: SYNTIANT, Irvine, CA (US)

( * ) Notice: Subject to any disclaimer, the term of this patent is extended or adjusted under 35 U.S.C. 154(b) by 1131 days.

(21) Appl. No.: 17/151,132

(22) Filed: Jan. 16, 2021

(65) Prior Publication Data

US 2021/0224649 A1 Jul. 22, 2021

Related U.S. Application Data

(60) Provisional application No. 62/962,327, filed on Jan. 17, 2020.

(51) Int. Cl.
*G06N 3/08* (2023.01)
*G06N 3/045* (2023.01)
(Continued)

(52) U.S. Cl.
CPC .............. *G06N 3/08* (2013.01); *G06N 3/045* (2023.01); *G10L 15/06* (2013.01); *G10L 2015/088* (2013.01)

(58) Field of Classification Search
CPC .......... G06N 3/08; G06N 3/045; G06N 3/065; G06N 3/105; G10L 15/06; G10L 2015/088; G10L 21/04
(Continued)

(56) References Cited

U.S. PATENT DOCUMENTS

| 6,035,270 A * | 3/2000 | Hollier | ............... | G10L 25/69 |
| | | | | 704/E19.009 |
| 6,119,083 A * | 9/2000 | Hollier | ............ | G10L 19/018 |
| | | | | 348/742 |

(Continued)

OTHER PUBLICATIONS

Jeih-weih Hung, Hao-teng Fan and Wen-hsiang Tu, "Enhancing the magnitude spectrum of speech features for robust speech recognition." EURASIP Journal on Advances in Signal Processing 2012,2012:189. (Year: 2012).*

(Continued)

*Primary Examiner* — Thuykhanh Le
(74) *Attorney, Agent, or Firm* — Rutan & Tucker LLP; Hani Z. Sayed; Ravi Mohan (57) ABSTRACT

Provided herein is an integrated circuit for generating augmented training data, including a host processor configured to receive a signal stream. The integrated circuit also has a co-processor commutatively coupled to the host-processor includes a neural network with at least a first set of weights configured to identify one or more target signals from the signal stream received from the host processor. A plurality of augmentation tools are also accessible to the integrated circuit. Finally, the integrated circuit, coupled computing device or other suitable digital signal processor stores a plurality of the one or more identified target signals, and upon reaching a predetermined threshold of identified target signals, utilizes the plurality of augmentation tools to generate an extended set of target signals, and generates a second set of weights for the neural network based on the extended set of target signals generated by the augmentation tools.

21 Claims, 8 Drawing Sheets

(51) Int. Cl.
*G10L 15/06* (2013.01)
*G10L 15/08* (2006.01)

(58) Field of Classification Search
USPC .................................................... 704/2, 202
See application file for complete search history.

(56) References Cited

U.S. PATENT DOCUMENTS

| | | | | |
|---|---|---|---|---|
| 6,453,284 | B1* | 9/2002 | Paschall | G10L 21/028 704/E21.013 |
| 10,535,120 | B2* | 1/2020 | Edwards | G06V 10/95 |
| 10,573,312 | B1* | 2/2020 | Thomson | G10L 15/22 |
| 11,328,087 | B1* | 5/2022 | Allen | G06F 21/602 |
| 11,620,991 | B2* | 4/2023 | Senior | G06N 3/02 704/232 |
| 11,741,191 | B1* | 8/2023 | Zilka | G06V 10/82 706/12 |
| 11,763,829 | B2* | 9/2023 | Xiao | G10L 25/30 704/500 |
| 2004/0172238 | A1* | 9/2004 | Choo | G10L 15/04 704/E15.005 |
| 2009/0157400 | A1* | 6/2009 | Huang | G10L 15/20 704/E15.001 |
| 2010/0076843 | A1* | 3/2010 | Ashton | G06Q 30/06 705/26.1 |
| 2011/0029310 | A1* | 2/2011 | Jung | G10L 21/0208 704/233 |
| 2011/0125500 | A1* | 5/2011 | Talwar | G10L 17/26 704/251 |
| 2011/0137647 | A1* | 6/2011 | Lee | H03G 3/32 704/226 |
| 2013/0262096 | A1* | 10/2013 | Wilhelms-Tricarico | G10L 13/04 704/207 |
| 2014/0019756 | A1* | 1/2014 | Krajec | H04L 63/0428 713/167 |
| 2015/0039299 | A1* | 2/2015 | Weinstein | G10L 15/16 704/202 |
| 2015/0127327 | A1* | 5/2015 | Bacchiani | G10L 15/26 704/202 |
| 2015/0245154 | A1* | 8/2015 | Dadu | G10L 19/0018 381/56 |
| 2016/0019896 | A1* | 1/2016 | Alvarez Guevara | G10L 17/24 704/249 |
| 2016/0099007 | A1* | 4/2016 | Alvarez | G10L 21/034 704/225 |
| 2016/0111108 | A1* | 4/2016 | Erdogan | G10L 21/0324 704/226 |
| 2016/0358043 | A1* | 12/2016 | Mu | G06V 30/194 |
| 2017/0032803 | A1* | 2/2017 | Pandey | G10L 21/0208 |
| 2018/0366138 | A1* | 12/2018 | Ramprashad | G10L 21/0208 |
| 2019/0208317 | A1* | 7/2019 | Woodruff | G06N 3/08 |
| 2019/0296910 | A1* | 9/2019 | Cheung | G06N 3/047 |
| 2020/0017117 | A1* | 1/2020 | Milton | G08G 1/0112 |
| 2020/0066271 | A1* | 2/2020 | Li | G10L 15/02 |
| 2020/0125952 | A1* | 4/2020 | Mosayyebpour | G10L 25/30 |
| 2020/0126534 | A1* | 4/2020 | Yoo | G10L 25/30 |
| 2020/0150919 | A1* | 5/2020 | Rand | H04R 1/406 |
| 2020/0152330 | A1* | 5/2020 | Anushiravani | G16H 70/60 |
| 2020/0160843 | A1* | 5/2020 | Shillingford | G10L 15/24 |
| 2020/0175961 | A1* | 6/2020 | Thomson | G10L 15/28 |
| 2020/0243094 | A1* | 7/2020 | Thomson | G10L 15/28 |
| 2020/0311306 | A1* | 10/2020 | Kim | G09C 5/00 |
| 2020/0312322 | A1* | 10/2020 | Cardinaux | G10L 15/16 |
| 2020/0327884 | A1* | 10/2020 | Bui | G06N 3/08 |
| 2020/0336846 | A1* | 10/2020 | Rohde | G10L 15/22 |
| 2020/0389545 | A1* | 12/2020 | Igler | H04L 41/145 |
| 2021/0117788 | A1* | 4/2021 | Muddle | H04L 9/30 |
| 2021/0166705 | A1* | 6/2021 | Chang | G10L 19/038 |
| 2021/0193161 | A1* | 6/2021 | Delcroix | G10L 15/16 |
| 2021/0209490 | A1* | 7/2021 | Casas | G06Q 50/02 |
| 2021/0248470 | A1* | 8/2021 | Kaskari | G06N 3/084 |
| 2021/0312725 | A1* | 10/2021 | Milton | G07C 5/008 |
| 2022/0068285 | A1* | 3/2022 | Xiao | G10L 19/0204 |
| 2022/0108177 | A1* | 4/2022 | Samek | G06N 3/045 |
| 2022/0223161 | A1* | 7/2022 | Fuchs | G10L 21/0232 |
| 2022/0414208 | A1* | 12/2022 | Teranishi | G09C 1/00 |
| 2023/0088029 | A1* | 3/2023 | Guo | G06N 3/044 704/202 |

OTHER PUBLICATIONS

PCT International Search Report and Written Opinion, PCT Application No. PCT/US2021/013768, mailed Mar. 31, 2021.

* cited by examiner

FIG. 8

SYSTEMS AND METHODS FOR NEURAL NETWORK TRAINING VIA LOCAL TARGET SIGNAL AUGMENTATION

PRIORITY

This application claims the benefit of and priority to U.S. Provisional Application No. 62/962,327, filed Jan. 17, 2020, which is incorporated herein in its entirety.

FIELD

The field of the present disclosure generally relates to neural network computing. More particularly, the field of the invention relates to an apparatus and a method for augmenting neural network training with locally captured training data.

BACKGROUND

Traditional central processing units ("CPUs") process instructions based on "clocked time." Specifically, CPUs operate such that information is transmitted at regular time intervals. Based on complementary metal-oxide-semiconductor ("CMOS") technology, silicon-based chips may be manufactured with more than 5 billion transistors per die with features as small as 10 nm. Advances in CMOS technology have been parlayed into advances in parallel computing, which is used ubiquitously in cell phones and personal computers containing multiple processors.

However, as machine learning is becoming commonplace for numerous applications including bioinformatics, computer vision, video games, marketing, medical diagnostics, online search engines, etc., traditional CPUs are often not able to supply a sufficient amount of processing capability while keeping power consumption low. In particular, machine learning is a subsection of computer science directed to software having the ability to learn from and make predictions on data. Furthermore, one branch of machine learning includes deep learning, which is directed at utilizing deep (multilayer) neural networks.

Currently, research is being done to develop direct hardware implementations of deep neural networks, which may include systems that attempt to simulate "silicon" neurons (e.g., "neuromorphic computing"). Digitally implemented neural network chips (e.g., silicon computing chips and associated processing systems designed for neuromorphic computing) operate by processing instructions in parallel (e.g., in contrast to traditional sequential computers) using bursts of electric current transmitted at non-uniform intervals. As a result, digitally implemented neural network chips require far less power to process information, specifically, artificial intelligence ("AI") algorithms. To accomplish this, neural network chips may contain as much as five times as many transistors as a traditional processor while consuming up to thousands of times less power. Thus, the development of digitally implemented neural network chips is directed to provide a chip and/or processor with vast processing capabilities that consumes far less power than conventional processors. Further, neural network chips are designed to support dynamic learning in the context of complex and unstructured data.

There is an ongoing need for increased sources of training data for neural network chips. The larger the input set of training data, the more robust and less error-prone the results become. For this reason, developers of neural network chips explore methods to generate new sets of training data to augment current systems. More robust neural network chips can lead to fewer false activations of the device which can decrease power consumption, improve battery lifespans, and reduce costs associated with connecting to a conversation agent. Conversely, the increased robustness of the neural network chip allows for fewer failed activations due to increased noise or other ambiguities in the signal that can't be recognized.

BRIEF DESCRIPTION OF THE DRAWINGS

The drawings refer to embodiments of the present disclosure in which.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In response to the increased demand in the market, more computing devices are being sold that utilize some form of voice control and/or voice activation. In order to provide timely responses to commands given by a user, the computing devices must deliver consistent responses in response to a user speaking a keyword or key phrase to activate the device. This creates an increased need for more robust listening systems that can both understand a speaker in non-optimal listening conditions, and avoid false activations from non-users. A well-understood method to increase a computing device's listening robustness, especially when utilizing any sort of neural network, is to increase the amount of data fed into the system to train the neural network to arrive at a desired outcome. However, training data is often difficult to obtain, especially training data that is personalized to a specific user of the computing device.

Furthermore, increased focus on user privacy limits the ability to create training data as recorded activations from a user that are transmitted to remote computing system can be objectionable to a sizeable portion of users. Thus, the methods and systems disclosed herein can generate an extended set of training data on a local device without the need to transmit the user data to a remote device. In many embodiments, this can be accomplished by utilizing a series of manipulation tools to change a particular set of known activation signals in order to better train the neural network. By storing the manipulation tools and known activation signals locally, privacy issues can be reduced as, in some embodiments, no data is required to be transmitted outside of the computing device.

In the following description, certain terminology is used to describe features of the invention. For example, in certain situations, the term "logic" may be representative of hardware, firmware and/or software that is configured to perform one or more functions. As hardware, logic may include circuitry having data processing or storage functionality. Examples of such circuitry may include, but are not limited or restricted to a microprocessor, one or more processor cores, a programmable gate array, a microcontroller, a controller, an application specific integrated circuit, wireless receiver, transmitter and/or transceiver circuitry, semiconductor memory, or combinatorial logic.

The term "neural network" may include any computing circuits that comprise a neuromorphic and/or digital implementation of a neural network. These circuits may include emulation of a plurality of neural structures and/or operations of a biologically-based brain and/or nervous system. Some embodiments of neural network circuits may comprise probabilistic computing, which can create algorithmic approaches to dealing with uncertainty, ambiguity, and contradiction in received input data. Neural network circuits can be composed of very-large-scale integration (VLSI) systems containing electronic analog circuits, digital circuits, mixed-mode analog/digital VLSI, and/or software systems.

The term "conversation agent" may include any program, routine, API, and/or service that facilitates a dialogue between a user and a computing system. Typically, conversation agents can provide tools necessary for natural language processing and other linguistics data that can allow a computing device to interact with a user via user speech commands and auditory responses. In many embodiments, a computing device utilizes a conversation agent by generating a connection to one. Often, a computing device does not contain the conversation agent, but may establish a connection to one over a network, such as the Internet.

The term "process" may include an instance of a computer program (e.g., a collection of instructions, also referred to herein as an application). In one embodiment, the process may be included of one or more threads executing concurrently (e.g., each thread may be executing the same or a different instruction concurrently).

The term "processing" may include executing a binary or script, or launching an application in which an object is processed, wherein launching should be interpreted as placing the application in an open state and, in some implementations, performing simulations of actions typical of human interactions with the application.

The term "object" generally refers to a collection of data, whether in transit (e.g., over a network) or at rest (e.g., stored), often having a logical structure or organization that enables it to be categorized or typed. Herein, the terms "binary file" and "binary" will be used interchangeably.

The term "file" is used in a broad sense to refer to a set or collection of data, information or other content used with a computer program. A file may be accessed, opened, stored, manipulated or otherwise processed as a single entity, object or unit. A file may contain other files, and may contain related or unrelated contents or no contents at all. A file may also have a logical format, and/or be part of a file system having a logical structure or organization of plural files. Files may have a name, sometimes called simply the "filename," and often appended properties or other metadata. There are many types of files, such as data files, text files, program files, and directory files. A file may be generated by a user of a computing device or generated by the computing device. Access and/or operations on a file may be mediated by one or more applications and/or the operating system of a computing device. A filesystem may organize the files of the computing device of a storage device. The filesystem may enable tracking of files and enable access of those files. A filesystem may also enable operations on a file. In some embodiments the operations on the file may include file creation, file modification, file opening, file reading, file writing, file closing, and file deletion.

The term "host processor" includes a primary processor such as a CPU or digital signal processor (DSP) of an IC in a system. The host processor is one that can stand alone but benefits from the addition of neural network computing provided by one or more specialized ICs or processors thereof through the microcontroller interface.

The term "co-processor" includes an additional processor interfaced with the host processor through a microcontroller interface. The additional processor can be configured to perform functions not possible with the host processor alone or functions the co-processor can perform faster or at lower power.

The term "enhancement filter" includes a filter configured to suppress undesired noise in a signal by selectively attenuating or boosting certain components of the signal on a time-varying basis. Likewise, "enhancement filtering" includes filtering to suppress undesired noise in a signal by selectively attenuating or boosting certain components of the signal on a time-varying basis.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Figure 1:
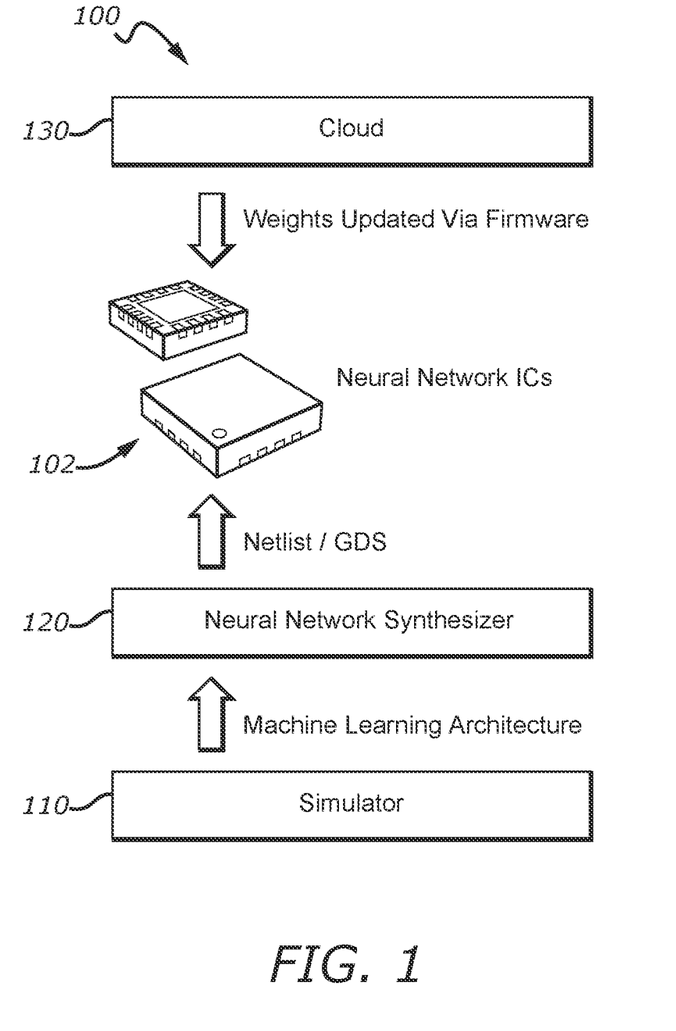
FIG. 1 provides a schematic illustrating an exemplary embodiment of a system for designing and updating neural network integrated circuits ("ICs") in accordance with some embodiments.

Referring now to FIG. 1, a schematic illustrating a system 100 for designing and updating neural network ICs is provided in accordance with some embodiments. As shown, the system 100 can include a simulator 110, a neural network synthesizer 120, and a cloud-based computer system 130 ("cloud") configured for designing and updating neural network ICs such as neural network IC 102. As further shown, designing and updating neural network ICs can include creating a machine learning architecture with the simulator 110 based on a particular problem. As those skilled in the art can appreciate, cloud-based computer systems may include, but are not limited to systems that can provide software as a service ("SaaS"), platform as a service ("PaaS"), and or infrastructure as a service ("IaaS") resources. The neural network synthesizer 120 can subsequently transform the machine learning architecture into a netlist directed to the electronic components of the neural network IC 102 and the nodes to which the electronic components are connected. In addition, the neural network synthesizer 120 can transform the machine learning architecture into a graphic database system ("GDS") file detailing the IC layout for the neural network IC 102. From the netlist and the GDS file for the neural network IC 102, the neural network IC 102, itself, can be fabricated in accordance with current IC fabrication technology. Once the neural network IC 102 is fabricated, it can be deployed to work on the particular problem for which it was designed. While the initially fabricated neural network IC 102 can include an initial firmware with custom synaptic weights between the nodes, the initial firmware can be updated as needed by the cloud 130 to adjust the weights. Being as the cloud 130 is configured to update the firmware of the neural network IC 102, the cloud 130 is not needed for everyday use.

Neural network ICs such as the neural network IC 102 can be up to multiple orders of magnitude more energy efficient than graphics processing unit ("GPU") solutions and up to a hundred times or more energy efficient than digital CMOS solutions with accuracies meeting or exceeding comparable software solutions. This makes such neural network ICs highly suitable for battery powered applications.

Neural network ICs such as the neural network IC 102 can be configured for application specific standard products ("ASSP") including, but not limited to, keyword detection, voice recognition, sound identification, and/or one or more audio filters. For example, if the particular problem is one of detecting keywords, the simulator 110 can create a machine learning architecture with respect to one or more aspects of spoken word identification. The neural network synthesizer 120 can subsequently transform the machine learning architecture into a netlist and a GDS file corresponding to a neural network IC for word identification, which can be fabricated in accordance with current IC fabrication technology. Once the neural network IC for word identification is fabricated, it can be deployed to work on spotting instances of keywords in or with, for example, a computing device as detailed further herein.

Neural network ICs such as the neural network IC 102 can be deployed in a variety of devices including, but not limited to, toys, sensors, wearables, augmented reality ("AR") systems or devices, virtual reality ("VR") systems or devices, mobile systems or devices, appliances, Internet-of-things ("IoT") devices, or hearing systems or devices.

Figure 2:
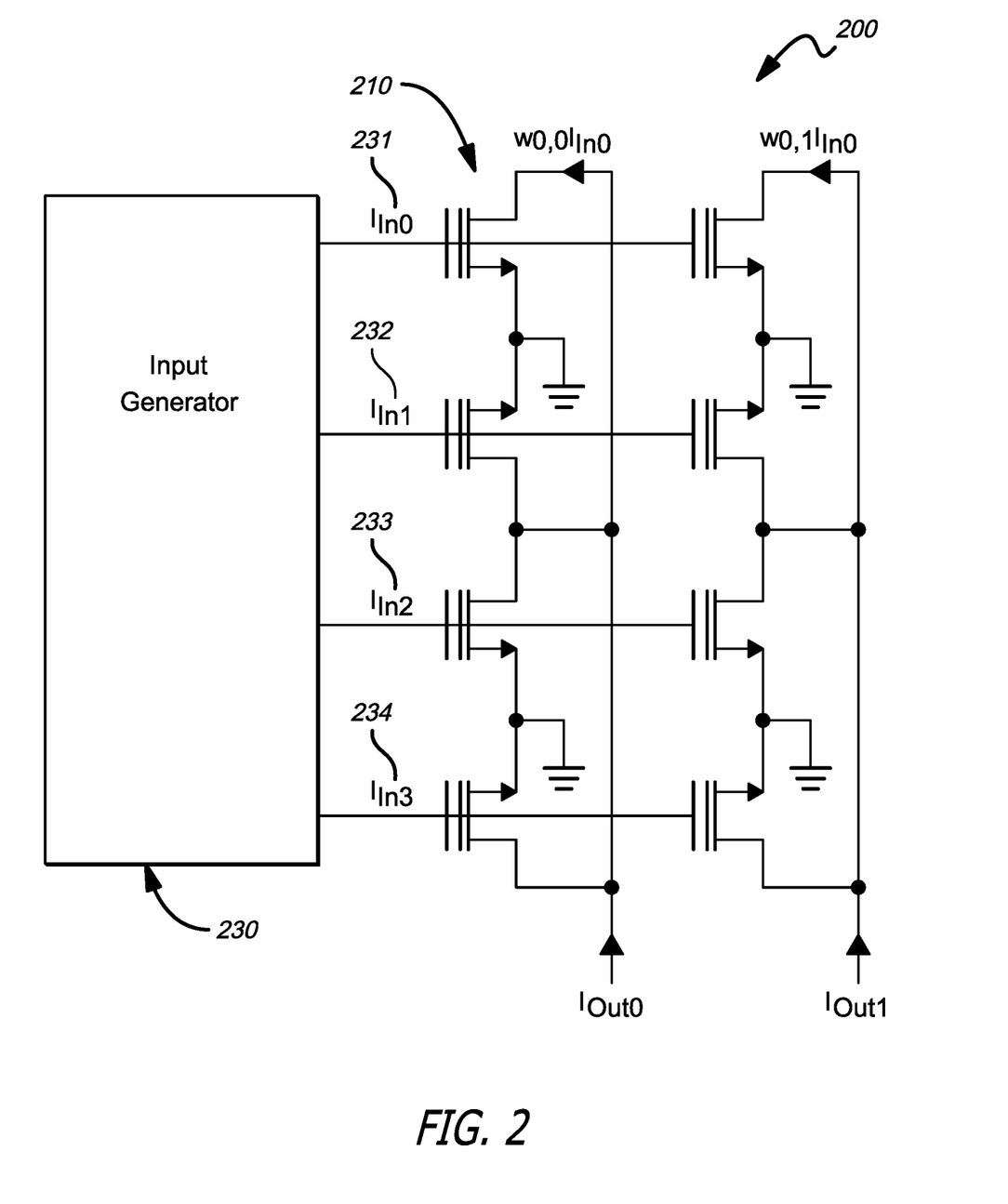
FIG. 2 provides a schematic illustrating an exemplary embodiment of an analog multiplier array in accordance with some embodiments.

Referring now to FIG. 2, a schematic illustrating an analog multiplier array 200 is provided in accordance with many embodiments. Such an analog multiplier array can be based on a digital NOR flash array in that a core of the analog multiplier array can be similar to a core of the digital NOR flash array or the same as a core of the digital NOR flash array. That said, at least select and read-out circuitry of the analog multiplier array are different than a digital NOR array. For example, output current is routed as an analog signal to a next layer rather than over bit lines going to a sense-amp/comparator to be converted to a bit. Word-line analogs are driven by analog input signals rather than a digital address decoder. Furthermore, the analog multiplier array 200 can be used in neural network ICs such as the neural network IC 102. For example, a neural network can be disposed in the analog multiplier array 200 in a memory sector of a neural network IC.

Since the analog multiplier array 200 is an analog circuit, input and output current values (or signal values) can vary in a continuous range instead of simply on or off. This is useful for storing weights, or coefficients, of a neural network as opposed to digital bits. In operation, of certain embodiments, the weights are multiplied in a core by input current values 231, 232, 233, 234 to provide output current values that are combined to arrive at a decision of the neural network. Further, the analog multiplier array 200 can utilize standard programming and erase circuitry to generate tunneling and erase voltages. In many embodiments, the input current values 231, 232, 233, 234 are provided by an input generator 230. Those skilled in the art will recognize that such input current values can be generated or obtained from a variety of devices or other components within the system. Furthermore, stored charge within a multiplier 210 can shift voltage on the floating gate and scales drain current by a weight w.

Figure 3:
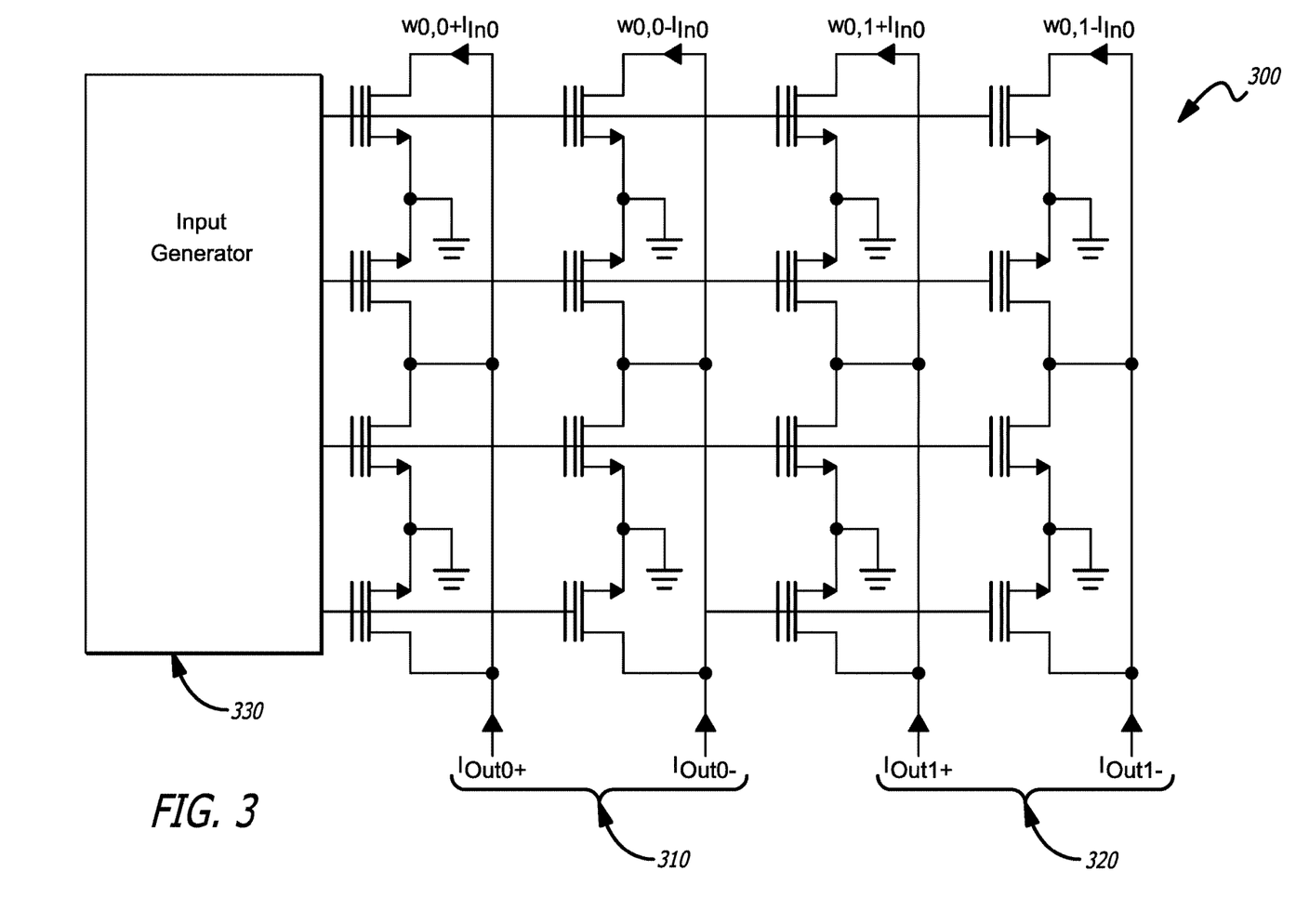
FIG. 3 provides a schematic illustrating an exemplary embodiment of an analog multiplier array in accordance with some embodiments.

Referring now to FIG. 3, a schematic illustrating an analog multiplier array 300 is provided in accordance with some embodiments. The analog multiplier array 300 can use two transistors (e.g., a positive transistor and a negative transistor) such as, but not limited to a metal-oxide semiconductor field effect transistor ("MOSFET") or field-effect transistor ("FET") to perform a two-quadrant multiplication of a signed weight (e.g., a positive weight or a negative weight) and a non-negative input current value. In many embodiments, the input current values can be provided by a separate input generator 330. The input generator 330 can be similar to that of the input generator depicted in FIG. 2 in certain embodiments. If an input current value provided by the input generator 330 is multiplied by a positive or negative weight, the product or output current value can respectively be either positive or negative. A positively weighted product can be stored in a first column (e.g., column corresponding to $I_{Out0+}$ in the analog multiplier array 300), and a negatively weighted product can be stored in a second column (e.g., column corresponding to $I_{Out0-}$ in the analog multiplier array 300). By way of example and not limitation, $I_{Out0+}$ and $I_{Out0-}$ can be taken as a differential current output 310, 320 that can then be provided to a plurality of current-sensing circuitry including, but not limited to, current mirrors, charge integrators, and/or transimpedance amplifiers. The foregoing differential outputs 310, 320 can provide positively and negatively weighted products or output signal values can be taken as a differential current value to provide useful information for making a decision.

Because each output current from the positive or negative transistor is wired to ground and proportional to the product of the input current value and the positive or negative weight, respectively, the power consumption of the positive or negative transistor is at or near zero when the input current values or weights are at or near zero. That is, if the input signal values are '0,' or if the weights are '0,' then no power will be consumed by the corresponding transistors of the analog multiplier array 300. This is significant because in many neural networks, a large fraction of the values or the weights can be '0,' especially after training. Therefore, due to the composition of the embodiments herein, energy is saved when there is nothing to do or going on. This is unlike differential pair-based multipliers, which consume a constant current (e.g., by means of a tail bias current) regardless of the input signal.

Figure 4:
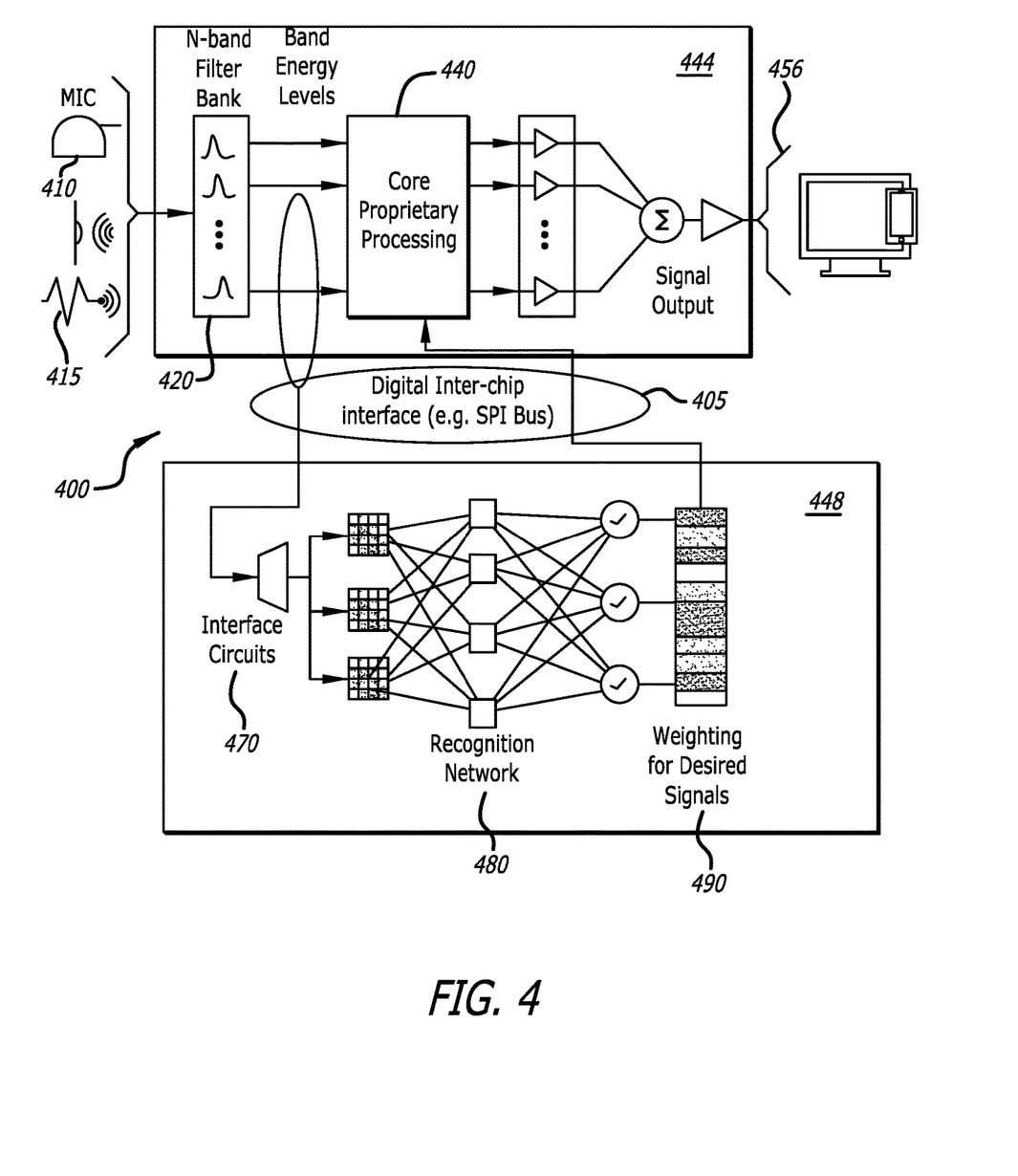
FIG. 4 is a schematic illustrating an exemplary embodiment of a generalized detection system that includes a pattern detection host processor and a co-processor of a neural network IC, in accordance with some embodiments.

Referring now to FIG. 4, a schematic is provided illustrating a digital inter-chip interface 405 between a neural network IC 448 and a host processor 444 in accordance with some embodiments. While the neural network IC 448 and the host processor 444 are shown as two distinct ICs in FIG. 4, it should be understood that the foregoing ICs can alternatively be embodied in a single monolithic IC. As such, description regarding the keyword spotter 400 between the co-processor of the neural network IC 448 and the host processor 444 should also be taken to describe the digital inter-chip interface 405 between a neural network co-processor within the neural network IC and special-purpose host processor of a single monolithic IC; that is, unless context clearly indicates otherwise.

As shown in FIG. 4, the host processor 444 can include, but is not limited to, an IC for speech recognition systems or devices including keyword spotters, speaker identification systems, or audio data detection systems. In many embodiments, an IC for a keyword spotter can include a keyword identifier host processor 440 (see "Core Proprietary Processing" in FIG. 4) comprising the host processor 444, as well as a microphone 410 (or other audio data source 415), a filter bank 420, and a signal output to external systems 456. In some embodiments, the external system 456 can include further devices and/or systems that can be configured to store received and identified target signals as well as process augmentation tools to generate extended sets of target signals suitable for neural network training.

It should be understood that the neural network co-processor can be interfaced with any one or more of a number of special-purpose host processors. The foregoing embodiments of the neural network co-processor interfaced with the keyword identifier host processor are merely provided for exposition. It should be understood that extension to other ASSPs might need certain modifications in line with the specific functions of the other ASSPs.

As shown in FIG. 4, in the case of speech recognition, the neural network IC 448 or a portion of the above-referenced single monolithic IC corresponding to the neural network IC 448 may include, but is not limited to, interface circuits, a deep-speech enhancement network with cloud-updateable synaptic weights, and a database of desired keywords. In some embodiments, the synaptic weights may be stored on a non-volatile memory, such as a flash memory or other suitable medium that is accessible to the neural network IC 448. Again, the host processor 444 or a portion of the above-referenced single monolithic IC corresponding to the host processor 444 may include, but is not limited to, the keyword identifier host processor 440, the microphone 410 (or other audio data source 415), the filter bank 420, and the suitable analog and/or digital signal output. The neural network IC 448 and the host processor 444 can be configured to communicate over a digital inter-chip interface 405 such as a serial peripheral interface ("SPI") bus or inter-integrated circuit ("I2C") bus.

The keyword identifier host processor 440 can be configured to transmit frequency elements or signal spectrum information in the form of Fourier transforms or similar frequency decompositions over the digital inter-chip interface 405 to the neural network co-processor for audio signal-processing tasks such as audio enhancement or de-noising. The neural network IC 448 may receive these tasks via interface circuits 470. The neural network co-processor can be configured to subsequently perform word recognition tasks via a recognition network 480 and transmit results back over the digital inter-chip interface 405 to the keyword identifier host processor 440. The word recognition tasks may generate weighting data for desired signals 490 which may also be utilize and/or stored for future use.

In some embodiments, the neural network co-processor may have access to a database comprising a list of keywords and/or known users whereby spoken keywords and speakers may be identified. In some embodiments, the results that are sent back to the host processor 444 may include weighting signals for desired words and/or speakers that are detected. The keyword identifier host processor 440 may be configured to subsequently transmit one or more signals indicating detection of a desired keyword and/or speaker.

In a variety of embodiments, the weighting for desired signals 490 in the neural network IC 448 can be updated via training by exposing the recognition network 480 to additional input source (i.e., training data). Upon each correct activation, the keyword spotter 400 can store the associated audio data or recording as an example of a correct activation with a known ground truth. Over time, multiple recordings of correct activations can be stored within the system. In additional embodiments, once a predetermined threshold has been reached, the keyword spotter 400 can utilize a set of audio manipulation tools to generate an extended set of recordings that can be used as training data for the recognition network 480.

By way of example and not limitation, the manipulation tools can include equalization algorithms, noise generating algorithms, pitch-shifting algorithms, and/or time-shifting algorithms. Each manipulation tool can be used alone or in combination to alter each of the known correct recordings in various ways. Each manipulation can be tailored by a variety of factors to generate a new recording that can be utilized as a new item in the set of training data used to train the recognition network 480. Depending on the number of manipulation tools available, along with the variability in the factors/settings of the manipulation tools, an extended set of recordings can be generated that can be orders of magnitude larger than the original set of recordings. This extended set of recordings provides a method of training the recognition network 480 based on training data associated with a particular user. For embodiments that encompass mobile phones, this will typically focus on a single user. However, for other embodiments utilized in household listening devices, the recognition network 480 can be trained on multiple users. In these embodiments, the computing system can associate stored recordings with particular known speakers and train the recognition network 480 multiple times based on extended training sets generated from recordings of each particular known speaker.

In this way, increased sets of training data associated with particular users of the computing device can be generated locally without the need to access outside networks, such as the Internet. Further, generalized network-wide updates may still be provided to the computing device which can then further be utilized as training data for the recognition network 480. In these cases, the resulting weights of the desired signals 490 can be configured to reflect not only the specific training data associated with the user, but also the network-wide generalized training data.

In further embodiments, the one or more wake signals may be comprised of signals that are sent to other special purpose ICs that are configured to perform specific tasks when desired keywords are detected. In a number of embodiments, the synaptic weights of the recognition network 480 can be updated either periodically or in response to a manual update process. In additional embodiments, the synaptic weights may be modified dynamically based on feedback given by the user and/or system.

It is contemplated that host processor 444 and neural network ICs 448 can be implemented in a single system or system on a chip ("SoC") configuration. It is also contemplated that certain embodiments may have either the host processor 444 and/or the neural network IC 448 implemented remotely with the digital inter-chip interface 405 being through a network connection.

Figure 5:
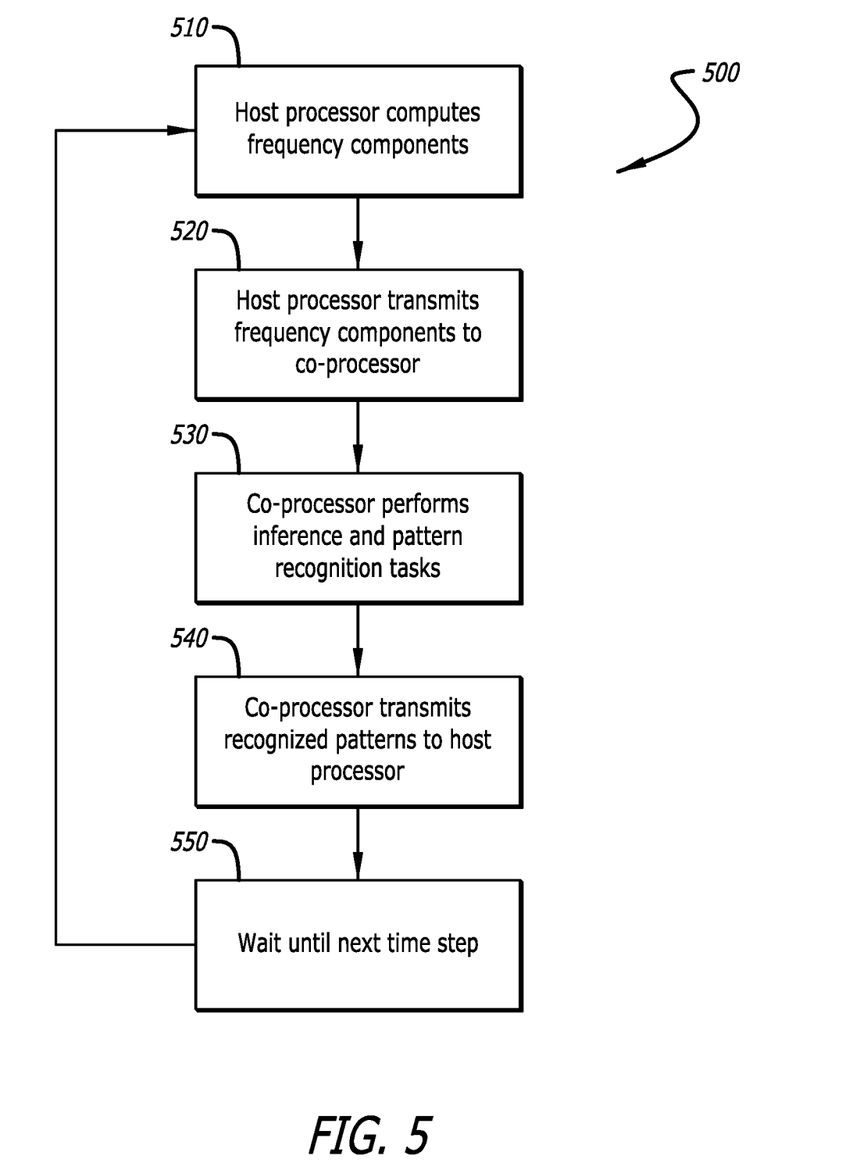
FIG. 5 provides a schematic illustrating an exemplary method of a neural network IC for detecting signal patterns received by way of various sensors, in accordance with some embodiments.

Referring now to FIG. 5, a schematic is provided illustrating a method 500 of a neural network IC for detecting signal patterns, received, for example, by way of the microphone 410 or other audio data source 415, in accordance with some embodiments. As shown, the method includes 1) a first step 510 where the pattern detection host processor computes frequency components; 2) a second step 520 where the pattern detection host processor transmits the frequency components to the neural network co-processor; 3) a step 530 where the neural network co-processor performs inference and identifies desired patterns from among the frequency components; 4) a step 540 where the neural network co-processor transmits the identified patterns to the pattern detection host processor; and 5) a step 550 where the neural network co-processor waits until the next time step.

In many embodiments, the patterns identified by the neural network co-processor are associated with keywords and/or known users. In certain embodiments, the pattern identification for keywords can be separate from the identification done for known users. This separation can include sequentially identifying keywords and then known users on the same neural network IC, it may be done in parallel on a neural network IC that has multiple recognition networks, and/or it may be accomplished on a plurality of neural network ICs that all communicate with the host processor via one or more inter-chip interfaces. In other embodiments, the recognition network and weighting for desired signals and patterns can be configured to recognize patterns associated with keywords spoken from a known speaker. This is in contrast to recognizing keywords and then processing those recognized keyword patterns against known speaker patterns. Instead, these embodiments may look for patterns specifically associated with keywords from the known speakers as a single type of data.

Figure 6:
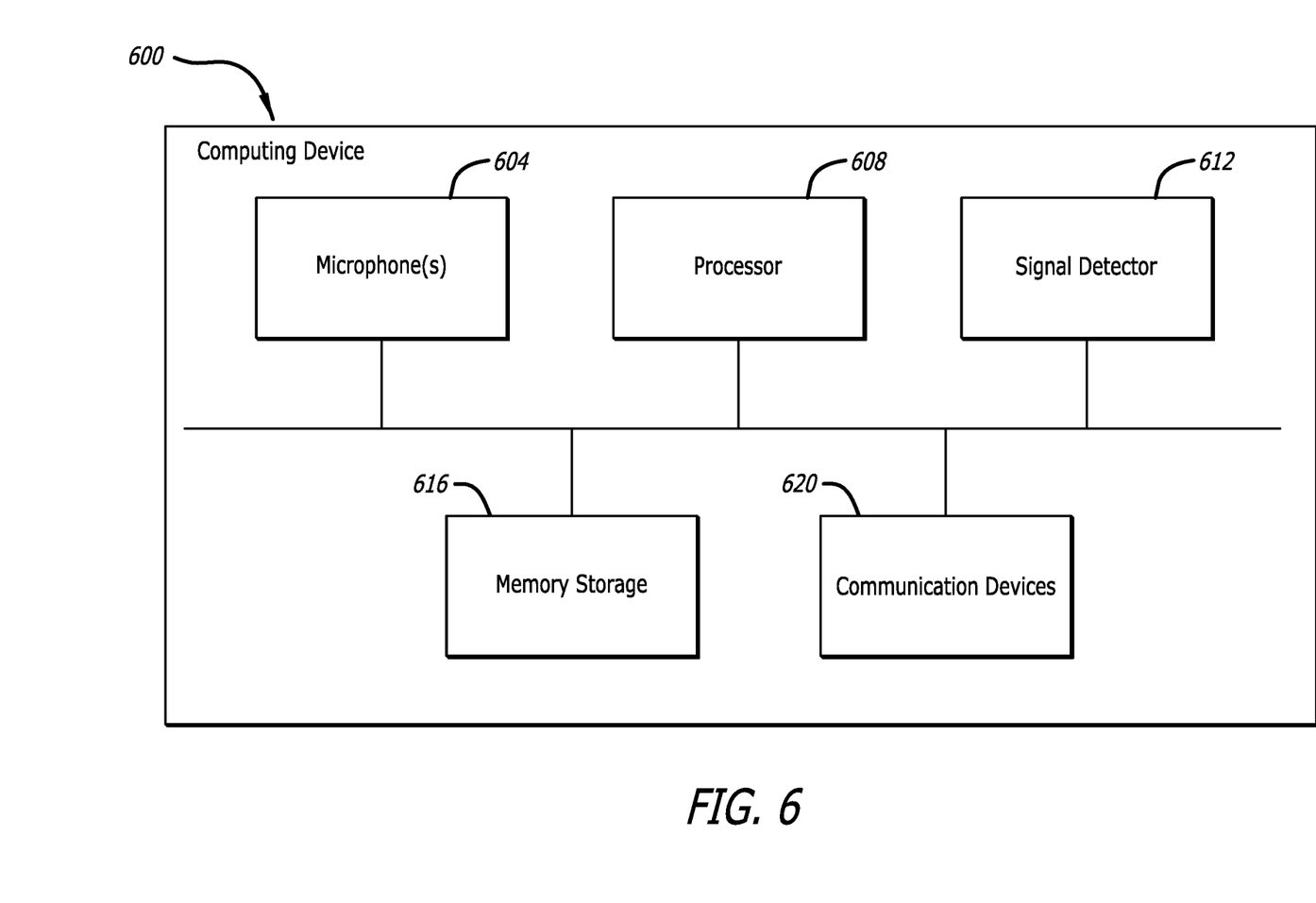
FIG. 6 provides a block diagram illustrating components comprising an exemplary computing device that includes a signal detector in accordance with some embodiments.

FIG. 6 is a block diagram illustrating components of an exemplary computing device 600 that may include a signal detector 612, including, but not limited to a keyword spotter and/or a known user detector as disclosed herein in connection with FIG. 4. In the illustrated embodiment, the computing device 600 may include one or more microphone(s) 604, at least one processor 608, a signal detector 612, a memory storage 616, and one or more communication devices 620. In some embodiments, the computing device 600 may also include additional or other components necessary for operation of the computing device 600. In some embodiments, the computing device 600 may include fewer components that perform similar or equivalent functions to those described herein.

In some embodiments, acoustic signals, once received, for example, as captured by the microphone(s) 604, may be converted into electric signals, which, in turn, may be converted, by the signal detector 612, into digital signals for processing in accordance with some embodiments. The processed signals may be transmitted for further processing to the processor 608. In some embodiments, some of the microphones 604 may be digital microphone(s) operable to capture acoustic signals and output digital signals. Some of the digital microphone(s) may provide for voice activity detection, or vocalization detection, and buffering of the audio data significantly prior to the vocalization detection.

The signal detector 612 may be operable to process an acoustic signal. In some embodiments, the acoustic signal is captured by the microphone(s) 604. In various embodiments, acoustic signals detected by the microphone(s) 604 may be utilized by the signal detector 612 to separate desired speech (for example, keywords) from ambient noise as well as speech generated by known speakers from unknown speakers, providing more robust automatic speech recognition (ASR) and generating fewer false wake-up signals.

In some embodiments, the signal detector 612 may comprise a neural network IC and a special purpose IC such as those depicted in FIG. 4. The signal detector 612 may be configured to transmit one or more signals indicating identification of desired keywords, known speakers, or other sounds and/or identifying data. In some embodiments, the one or more signals may be sent to the processor 608 or other special purpose ICs that are configured to perform specific tasks when desired keywords, speakers, or other sounds are identified. Thus, the signal detector 612 may be configured to provide hands-free operation of the computing device 600.

In some embodiments, the signal detector 612 may be configured to remain in a low-power, always-on state whereby the signal detector 612 remains continuously ready to detect target information, such as specific keywords, and/or specific speakers. As will be recognized, conventional DSP detectors, such as keyword spotters, generally reside in a low-awareness, low-power consumption state until something in the environment, such as speech, occurs and then the entire DSP is powered-on to a higher-power consumption state. With the entire DSP powered-on, the conventional DSP keyword spotter is then placed into a fully-aware state whereby keywords may be detected. In the case of word detection, however, the time required to switch the DSP from low-power to full-power leads to latency wherein the keyword spotter may miss the first one or more words. In some implementations, latency can lead to adverse results. For example, in the instance of a DSP detector that is configured for security, the time wasted due to latency may lead to a loss of crucial evidence regarding a crime that has been committed.

Unlike conventional DSP detectors, the signal detector 612 can remain fully aware when the computing device 600 is placed into a low-power state. The signal detector 612 is capable of detecting changes in the environment, such as speech, without taking time to power-on other components before detection may occur. Thus, the signal detector 612 is configured to detect keywords, or other sounds, with substantially zero latency. It is contemplated that the fully aware state of the signal detector 612 may be achieved by operating the signal detector within a power envelop that is insignificant to the rest of the components comprising the computing device 600. In some embodiments, for example, the signal detector 612 may be implemented as the smallest component comprising the computing device 600, such that the signal detector may be powered by current leakage from the battery. As such, when the components comprising the computing device 600 are placed into a lower power, sleep mode, the signal detector 612 may continue operating in a fully aware state that is sustained by normal leakage current from the battery.

The processor 608 may include hardware and/or software operable to execute computer programs stored in the memory storage 616. The processor 608 may use floating point operations, complex operations, and other operations needed for implementations of embodiments of the present disclosure. In some embodiments, the processor 608 of the computing device 600 may include, for example, at least one of a DSP, an audio processor, a general-purpose processor, and/or similar processing units.

The exemplary computing device 600 may be operable, in various embodiments, to communicate over one or more wired or wireless communications networks, for example, via communication devices 620. In some embodiments, the computing device 600 may send at least audio signals (speech) over a wired or wireless communications network. In some embodiments, the computing device 600 may encapsulate and/or encode the at least one digital signal for transmission over a wireless network, such as a cellular network.

Moreover, it should be understood that the computing device 600 in general, and the signal detector 612 in particular, are not to be limited to detecting keywords for hands-free operation of the computing device 600. For example, in some embodiments, the computing device 600 may be configured for a security-related implementation. As such, the computing device 600 may be configured to detect previously defined adverse sounds, such as glass breaking, within a restricted area. Upon detecting an adverse sound, the signal detector 612 may be configured to output one or signals indicating to other components that the adverse sound has been detected. In some embodiments, for example, the signal detector 612 may trigger an alarm system upon detecting an adverse sound.

In an embodiment, the signal detector 612 is configured to operate in absence of an active connection to a communications network, such as the Internet or the cloud 130. As discussed in connection with FIG. 1, although the cloud 130 is configured to update the firmware of the signal detector 612, the cloud 130 may not be needed for everyday use of the signal detector 612. Those skilled in the art will appreciate that operating the signal detector 612 in an offline state, in absence of a connection to the cloud 130, is advantageously more secure than having an always-on connection to the cloud 130 or the Internet. For example, when the signal detector 612 is implemented in a security capacity, operating in the offline state prevents unwanted intrusion by way of connections from the cloud 130. In this way, generating extended recording set data and subsequently generating new weights for a neural network can occur without the need for connection to the cloud 130 when accomplished entirely within the computing device 600. Further, the capability to operate in the offline state facilitates implementing the signal detector 612 where a connection to the cloud 130 is not always available, such as when the signal detector is implemented in a hearing aid or other type of low physical footprint device.

However, machine learning may be done by way of a connection with the cloud 130, as disclosed with respect to FIG. 1. In an embodiment, synaptic weights may be downloaded and stored to a non-volatile memory, such as flash memory or the memory storage 616. The stored synaptic weights may be accessed by the signal detector 612 so as to enable differentiating between signals received by the signal detector 612 in absence of the connection to the cloud 130. As will be appreciated, differentiating between the signals may enable the signal detector 612 to recognized keywords, and/or specific speakers, as desired.

In one embodiment, user-specific target information, such as specific keywords, and/or specific speakers, may be combined with an existing database to form a user-specific training set that may be used to train an existing neural network type model on the combined data to produce synaptic weights. A weight file may be generated and written into a chip that may execute user-specific functions associated with the target information. This updated weight file can be generated using both manipulated and non-manipulated user-specific target information data.

Figure 7:
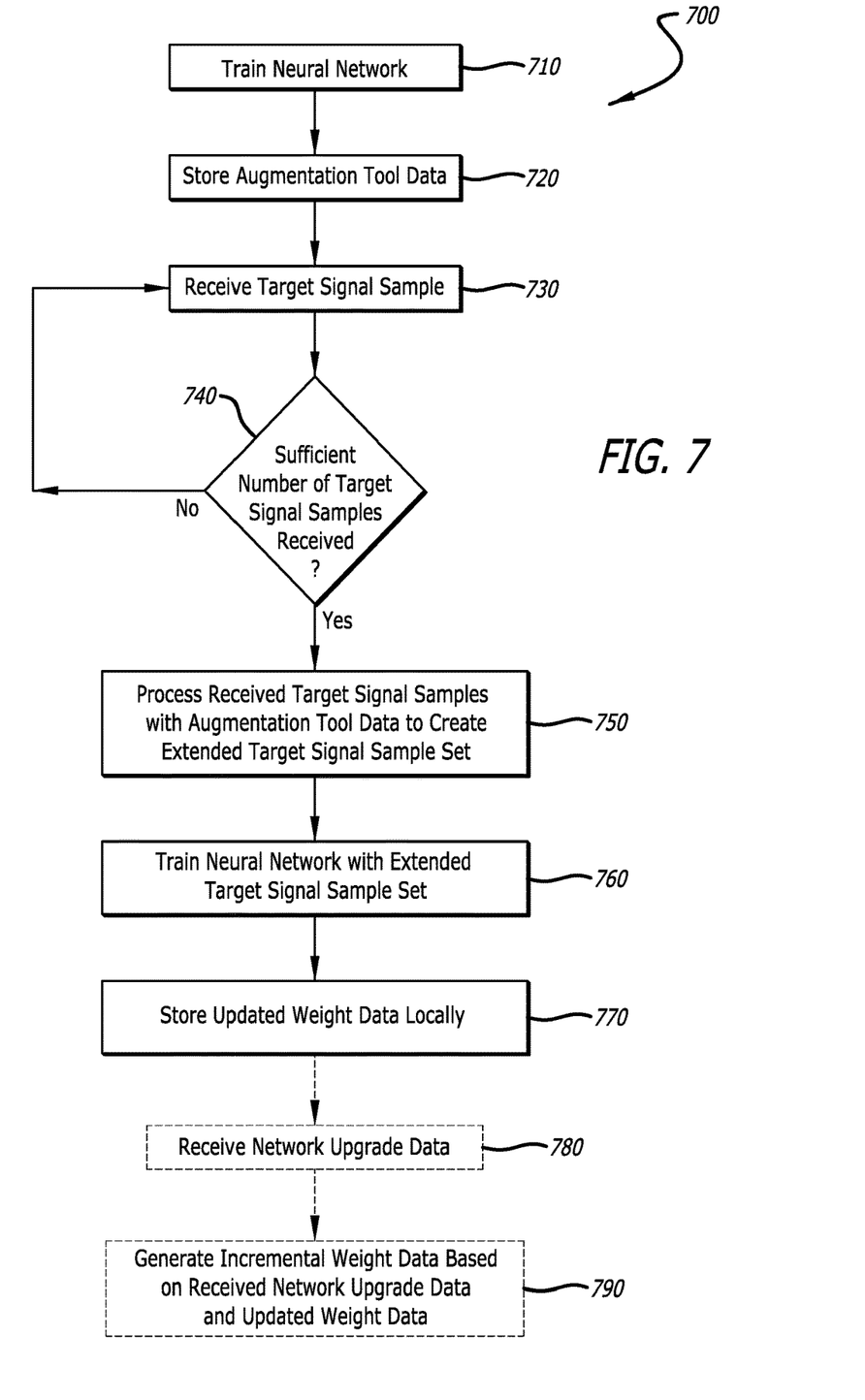
FIG. 7 is a flowchart illustrating a method of generating updated weight data for a neural network utilizing local data.

Referring now to FIG. 7, a flowchart illustrating a method of generating updated weight data for a neural network utilizing local data is shown. In many embodiments, the process 700 can begin prior to a product being sold where a neural network is first trained by the manufacturer of the computing device (step 710). In certain embodiments, the initial training of the neural network can be accomplished upon initialization of the computing device by the user and/or via an initial training session. Often, the initial neural network training is done to give the computing device a base level of functionality that can be further refined in response to interactions with the user.

In further embodiments, prior to use by the user, a plurality of augmentation tools can be stored as augmentation tool data within the computing device (step 720). Augmentation tools can comprise any set of processing hardware or software algorithms that can manipulate and/or edit an identified target signal sample spoken by the user to generate a new target signal sample that can then be used to train the neural network. In some embodiments, augmentation tools may include, but are not limited to, equalization adjustment algorithms, spectral envelope adjustment algorithms, random number/noise generators (or other synthesis algorithms), pitch-shifting algorithms, and/or time-stretching algorithms.

An often large goal of any neural network is to generate decisions based on often incomplete, noisy, and/or ambiguous input data. By exposing the neural network to increased examples of input data with various levels of noise/ambiguity, and where the ground truth is known, the network becomes more robust and is able to better generate correct choices based on more ambiguous input data in the future. The augmentation tools provide methods to create more ambiguous input data with known ground truths. For example, when given a target signal recording of a user speaking a keyword or key phrase used to wake a computing device from a lower power consumption mode, the augmentation tools can take the known recording and manipulate the data by adding noise into the recording, speeding up and slowing down the recording, and equalizing the recording to reduce bass and/or treble frequency bands.

Those skilled in the art will recognize that the augmentation tools can further comprise a plurality of settings or other parameters that can be chosen when manipulating the target signal data. For example, pitch-shifting audio recordings can be done with various levels of degree both upward and downward in scale. Likewise, time-shifting algorithms can both decrease the amount of time needed to play the file (speeding it up), and increasing the time needed (slowing it down). Equalization algorithms can select any number and width of frequency bands to manipulate by increasing or decreasing their levels. It is contemplated that any audio filter can be utilized to manipulate target signal data in order to generate additional augmented target signal data.

Over time, the computing device will receive a plurality of target signal samples from the user (step 730). As can be understood, conditions can vary when the target signals are received. For example, computing devices that are mobile can receive target samples from a variety of locations which may affect the color and/or spectral shape of the target signal data. To better account for this, the process 700 continues once there is a sufficient number of target samples (step 740). In certain embodiments, the process 700 may continue once after a pre-determined amount of time has passed regardless of the amount of target samples obtained. In these embodiments, the amount of time may be repeated or may be switched from a time-based limitation to a quantity-based one after a pre-determined number of time-based cycles through the process 700.

Once the process 700 continues, the identified target sample data is processed with the augmentation tools (step 750). The processing by the augmentation tools generates a series of augmented target signal samples that can be collected as an extended target signal sample set. In many embodiments, the quantity of augmented target signal samples can be orders of magnitude larger than the original target signal samples. By way of example and not limitation, an initial target sample set may consist of approximately fifty target samples which can then be processed through the augmentation tools to generate an extend target signal sample set that consists of approximately five thousand augmented target signal samples. Those skilled in the art will understand that the exact number of augmented target signal samples generated can vary based on factors including, but not limited to, length of original target signal samples, storage space available in the computing system, and/or processing resources available.

In response to the generation of an extended target signal sample set, the process 700 can subsequently train the neural network (step 760). In many embodiments, the training of the neural network is to simply process the extended target signal sample set as input data and compare the results against the ground truth, thus modifying weights associated with the neural network. Typically, in response to being exposed and trained with the extended target sample set, the neural network becomes more robust. In additional embodiments, the data associated with the weights of the neural network is stored within a local data storage system (step 770). While not required in every embodiment, the storage of weight data associated with a particular user can be stored locally to avoid privacy-related issues. Since no user-specific data regarding the weights of the neural network is transferred outside of the computing device, fewer privacy concerns are raised and increased conformity of local and/or national privacy laws is possible.

In some instances, an update may be received from a network connection (step 780). In many embodiments, the update is a global update that is transmitted to all related computing devices of a particular make and/or model. Updates can include data associated with the weights of the neural network. In these embodiments, the computing device can incorporate the associated neural network data into the previously augmented weight data of the neural network to generate incremental weight data (step 790). In this way, the computing device can incorporate both locally derived neural network weight updates as well as global weight updates to create further robust neural networks that are tuned to specific users.

Figure 8:
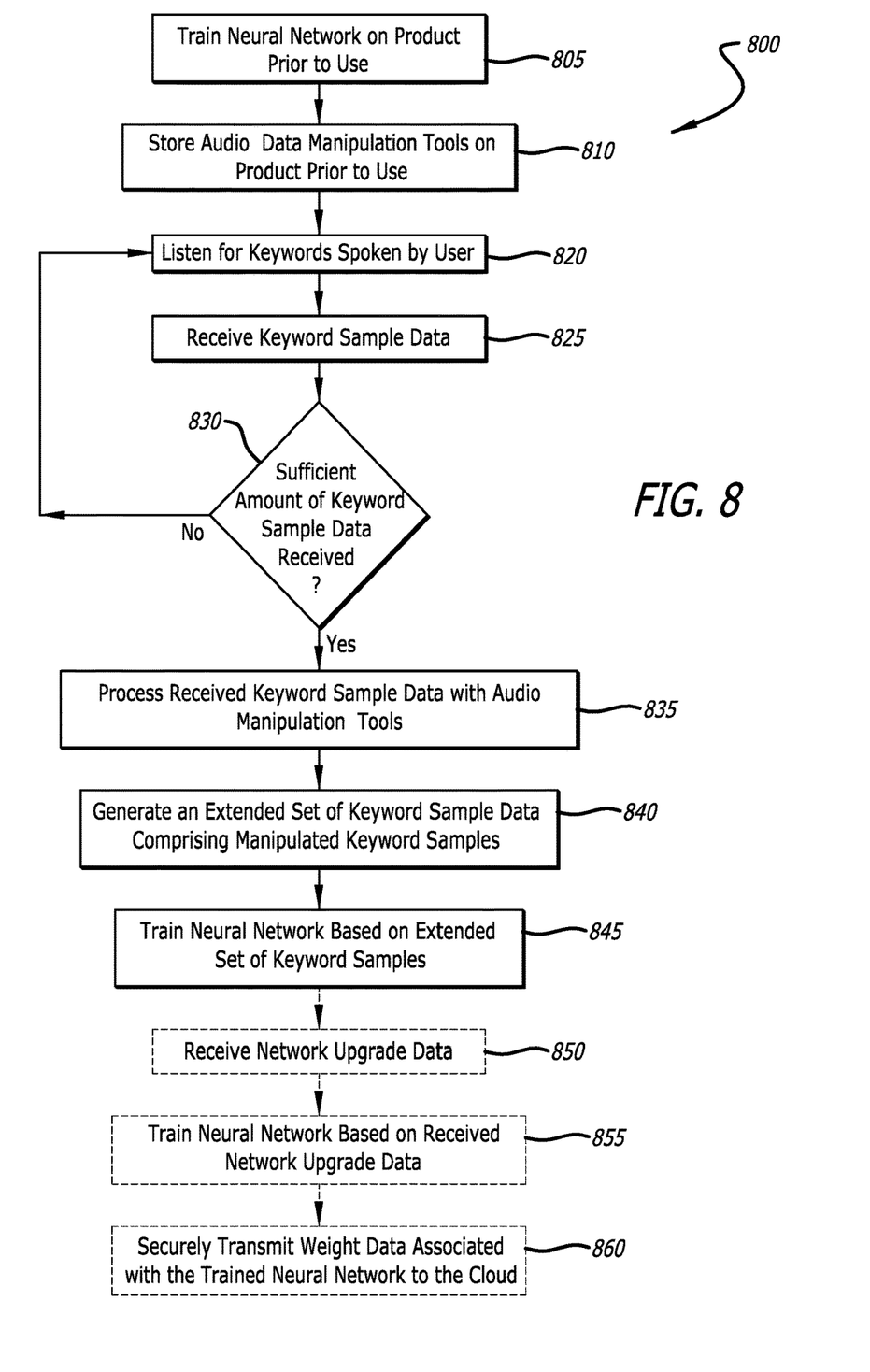
FIG. 8 is a flowchart illustrating a method of training a neural network based on an extended set of keyword samples, according to the present disclosure.

Referring now to FIG. 8, a flowchart illustrating a method of training a neural network based on an extended set of keyword samples, according to the present disclosure is shown. As an exemplary embodiment, the process 800 described herein relates to updating of keyword and/or keyword phrases within a computing device configured to listen and/or generate a dialogue with the user. The neural network can first be trained during the manufacturing process (step 805). In some embodiments, the training is done on a single neural network as a global starting point and installed onto each neural network. In this way, each computing device does not need to be trained, but is simply given an initial set of weights for the neural network.

In further embodiments, tools required for manipulation of the audio file can be installed on the product during the manufacturing process (step 810). As described above in the discussion of FIG. 7, audio data manipulation tools can include any of a number of filters and/or algorithms that can later be applied to retrieved target data signals. It is contemplated that in certain embodiments, the installation of an initial set of weights for the neural network as well as the audio data manipulation tools can be installed after the manufacturing process, but before the user starts use of the product (e.g., during an installation and/or initial product setup phase). It is further contemplated that certain embodiments may not have the direct audio data manipulation tools installed on the computing device, but instead contain logic that allows the computing device to remotely transmit the audio data for processing. Furthermore, some embodiments may simply download audio data manipulation tools as needed and in response to the quality and/or quantity of the acquired target signal response data.

Once provided to the user, the process 800 can put the computing device into a listening mode configured to listen for keywords spoken by the user (step 820). This can often be done via a microphone picking up the user's spoken words within a certain proximity of the computing device, and/or it can be done by receiving an audio data stream from another source. Once a user speaks a pre-determined keyword or key phrase, the mobile computing device can then receive that associated keyword sample data and store it in a storage system for later use (step 825). The process 800 can then determine if a sufficient amount of keyword sample data has been received in order to continue (step 830). In many cases, the determination comprises verifying that a pre-determined number of keyword samples have been recorded. In other embodiments, the determination may be based on the amount of time elapsed between the currently received keyword sample data and the last capture of keyword sample data.

When an insufficient amount of keyword sample data has been collected, the process 800 returns the computing device to listening mode for words spoken by the speaker. However, when a sufficient amount of keyword sample data has been collected, the process 800 can process the received keyword sample data with the audio data manipulation tools (step 835). As discussed above in the discussion of FIG. 7, the processing of the keyword sample data can include running each keyword sample through each audio filter/algorithm with a plurality of settings and/or parameters, which can then generate a series of augmented keyword samples. This process 800 generates an extended set of keyword sample data comprised of the manipulated keyword samples (step 840). This extended set of keyword sample data can then be utilized by the computing device as input data to further train the neural network (step 845).

As also discussed above in reference to FIG. 7, the process 800 can optionally receive network upgrade data that is associated with a global network update (step 850). In certain embodiments, the network upgrade data comprises neural network weight updates. These updates could include incremental upgrades in the weighting and/or could reflect changes is keywords/key phrases. The neural network can again be trained with the received network upgrade data which can further improve the overall neural network robustness while retaining weight data that is associated with a specific user(s) of the computing device (step 855).

In certain embodiments, the user may desire for their associated neural network weight data to be backed up to a remote device. In order to retain privacy in these instances, the process 800 can optionally facilitate a secure transfer between the computing device and an external storage system (step 860). In these optional embodiments, the weights of the neural network can be processed as a set of weight data that may be transmitted utilizing hash encryption, or obfuscated as a subset of data within a larger set of data to be transmitted. Certain embodiments may allow for the personalized weight data to be transmitted to a cloud-based storage system, while other embodiments may provide a means for transmitting the data to another computing device and/or back to the manufacturer.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. An integrated circuit for generating augmented training data, comprising:
   a host processor configured to receive a signal stream and compute one or more frequency components;
   a co-processor commutatively coupled to the host processor comprising a neural network with at least a first set of weights configured to identify one or more target signals from the signal stream received from the host processor;
   wherein the host processor transmits the frequency components to the co-processor;
   wherein the neural network of the co-processor performs inference and identifies one or more patterns from among the frequency components;
   a plurality of augmentation tools;
   wherein the integrated circuit further stores a plurality of the one or more identified target signals, and upon reaching a predetermined number of identified target signals, utilizes the plurality of augmentation tools to generate an extended set of target signals, and generates a second set of weights for the neural network based on the extended set of target signals generated by the augmentation tools; and
   wherein one of the first or second set of weights are processed as a set of weight data that is transmitted utilizing hash encryption, or obfuscated as a subset of data within a larger set of data to be transmitted.

2. The integrated circuit of claim 1, wherein the signal stream comprises an audio data stream.

3. The integrated circuit of claim 2, wherein the one or more target signals comprise at least one keyword.

4. The integrated circuit of claim 3, wherein the at least one keyword is spoken by the same user.

5. The integrated circuit of claim 4, wherein the plurality of one or more identified target signals comprise a plurality of audio recordings of the at least one keyword or key phrase spoken by the same user.

6. The integrated circuit of claim 5, wherein the plurality of audio recordings of the at least one keyword or key phrase spoken by the same user are of the same keyword or key phrase.

7. The integrated circuit of claim 1, wherein the plurality of augmentation tools comprise equalization algorithms, noise generating algorithms, pitch-shifting algorithms, and time-shifting algorithms.

8. The integrated circuit of claim 1, wherein the extended set of target signals is at least one order of magnitude greater than the plurality of the one or more identified target signals.

9. The integrated circuit of claim 1, wherein second set of weights for the neural network are generated by utilizing the extended set of target signals as training data for the neural network.

10. The integrated circuit of claim 1, wherein the generation of the extended set of target signals is processed on a remote device.

11. An integrated circuit for generating augmented training data, comprising:
    a host processor commutatively coupled to a digital signal processor configured to receive a signal stream and compute one or more frequency components;
    a co-processor commutatively coupled to the host processor comprising a neural network with at least a first set of weights configured to identify one or more target signals from the signal stream received from the host processor; and
    a plurality of augmentation tools;
    wherein the integrated circuit further directs the stores a plurality of the one or more identified target signals, and upon reaching a predetermined number of identified target signals, directs the digital signal processor to utilize the plurality of augmentation tools to generate an extended set of target signals, and a second set of weights for the neural network based on the extended set of target signals generated by the augmentation tools;
    wherein the co-processor performs inference and identifies one or more patterns from among the frequency components; and
    wherein the first and second set of weights are transmitted utilizing hash encryption, or obfuscated as a subset of data within a larger set of data to be transmitted.

12. The integrated circuit of claim 11, wherein the signal stream comprises an audio data stream.

13. The integrated circuit of claim 12, wherein the one or more target signals comprise at least one keyword.

14. The integrated circuit of claim 13, wherein the at least one keyword is spoken by the same user.

15. The integrated circuit of claim 14, wherein the plurality of one or more identified target signals comprise a plurality of audio recordings of the at least one keyword or key phrase spoken by the same user.

16. The integrated circuit of claim 15, wherein the plurality of audio recordings of the at least one keyword or key phrase spoken by the same user are of the same keyword or key phrase.

17. The integrated circuit of claim 11, wherein the plurality of augmentation tools comprise equalization algorithms, noise generating algorithms, pitch-shifting algorithms, and time-shifting algorithms.

18. The integrated circuit of claim 11, wherein the extended set of target signals is at least one order of magnitude greater than the plurality of the one or more identified target signals.

19. The integrated circuit of claim 11, wherein second set of weights for the neural network are generated by utilizing the extended set of target signals as training data for the neural network.

20. The integrated circuit of claim 11, wherein the generation of the extended set of target signals is processed on a remote device.

21. A method for generating augmented training data, comprising:

receiving a first set of neural network weight data;
receiving a plurality of identified target signals;
computing one or more frequency components;
generating, in response to the received plurality of identified target signals exceeding a first pre-determined number, an extended set of target signals with at least one augmentation tools;
generating a second set of neural network weight data with the extended set of target signals; and
performing an inference and identifying one or more patterns from among the frequency components; and
wherein at least the first set of neural network weight data is transmitted utilizing hash encryption, or obfuscated as a subset of data within a larger set of data to be transmitted.

* * * * *